US010165542B2

(12) United States Patent
Kumar et al.

(10) Patent No.: US 10,165,542 B2
(45) Date of Patent: Dec. 25, 2018

(54) LOCALIZATION OF A MOBILE DEVICE

(71) Applicant: PHILIPS LIGHTING HOLDING B.V., Eindhoven (NL)

(72) Inventors: Sandeep Shankaran Kumar, Waalre (NL); Ashish Vijay Pandharipande, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/551,692

(22) PCT Filed: Feb. 17, 2016

(86) PCT No.: PCT/EP2016/053360
§ 371 (c)(1),
(2) Date: Aug. 17, 2017

(87) PCT Pub. No.: WO2016/135021
PCT Pub. Date: Sep. 1, 2016

(65) Prior Publication Data
US 2018/0020421 A1    Jan. 18, 2018

(30) Foreign Application Priority Data
Feb. 23, 2015   (EP) .................................... 15156043

(51) Int. Cl.
*H04W 64/00*    (2009.01)
*H04W 12/02*    (2009.01)
(Continued)

(52) U.S. Cl.
CPC ............. *H04W 64/00* (2013.01); *H04W 4/04* (2013.01); *H04W 12/02* (2013.01); *H04W 12/04* (2013.01)

(58) Field of Classification Search
CPC . H04L 67/18; H04L 12/2858; H04L 43/0864; H04W 4/02; H04W 4/023; H04W 28/08; H04W 40/20; H04W 60/005; H04W 4/025; G01S 5/0284; H04M 2203/2094; H04M 2242/30; H04M 3/42348
See application file for complete search history.

(56) References Cited

U.S. PATENT DOCUMENTS

2004/0017312 A1   1/2004   Anderson et al.
2011/0177825 A1   7/2011   Huang
(Continued)

FOREIGN PATENT DOCUMENTS

WO    2014024005 A1    2/2014

*Primary Examiner* — Nizar N Sivji
(74) *Attorney, Agent, or Firm* — Meenakshy Chakravorty (57) ABSTRACT

A method of determining a location of a mobile device based on a first location estimation performed using a first location system, the method comprising: obtaining an initial estimate of the mobile device's location based on a second location estimation that is coarser than the first location estimation; using the initial estimate to select a subset of the reference nodes of the first network that are within a defined vicinity of the mobile device's location; and from amongst a database of respective assistance data for each of the wireless reference nodes stored on a server of the first location system, selectively providing the respective assistance data for each of said subset of wireless reference nodes to a localization module on the mobile device, for the localization module of the mobile device to calculate a finer estimate of the mobile device's location.

12 Claims, 3 Drawing Sheets

(51) Int. Cl.
  *H04W 4/00* (2018.01)
  *H04W 4/04* (2009.01)
  *H04W 12/04* (2009.01)

(56) References Cited

U.S. PATENT DOCUMENTS

2011/0250903 A1  10/2011  Huang et al.
2012/0149415 A1   6/2012  Valaee et al.
2013/0250851 A1   9/2013  Lakhzouri et al.
2014/0005939 A1   1/2014  Schatzberg et al.

LOCALIZATION OF A MOBILE DEVICE

CROSS-REFERENCE TO PRIOR APPLICATIONS

This application is the U.S. National Phase application under 35 U.S.C. § 371 of International Application No. PCT/EP2016/053360, filed on Feb. 17, 2016, which claims the benefit of European Patent Application No. 15156043.0, filed on Feb. 23, 2015. These applications are hereby incorporated by reference herein.

TECHNICAL FIELD OF THE INVENTION

The present disclosure relates to localization, i.e. the process of determining the location of a mobile device based on a network of wireless nodes.

BACKGROUND OF THE INVENTION

In an indoor positioning system, the location of a wireless device such as a mobile user terminal can be determined with respect to a location network comprising a plurality of wireless reference nodes, in some cases also referred to as anchor nodes. These anchors are wireless nodes whose locations are known a priori, typically being recorded in a location database which can be queried to look up the location of a node. The anchor nodes thus act as reference nodes for localization. Measurements are taken of the signals transmitted between the mobile device and a plurality of anchor nodes, for instance the RSSI (receiver signal strength indicator), ToA (time of arrival) and/or AoA (angle of arrival) of the respective signal. Given such a measurement from three or more nodes, the location of the mobile terminal may then be determined relative to the location network using techniques such as trilateration, multilateration or triangulation. Given the relative location of the mobile terminal and the known locations of the anchor nodes, this in turn allows the location of the mobile device to be determined in more absolute terms, e.g. relative to the globe or a map or floorplan.

Another localization technique is to determine the location of mobile device based on a "fingerprint" of a known environment. The fingerprint comprises a set of data points each corresponding to a respective one of a plurality of locations throughout the environment in question. Each data point is generated during a training phase by placing a wireless device at the respective location, taking a measurement of the signals received from or by any reference nodes within range at the respective location (e.g. a measure of signal strength such as RSSI), and storing these measurements in a location server along with the coordinates of the respective location. The data point is stored along with other such data points in order to build up a fingerprint of the signal measurements as experienced at various locations within the environment. Once deployed, the signal measurements stored in the fingerprint can then be compared with signal measurements currently experienced by a mobile device whose location is desired to be known, in order to estimate the location of the mobile device relative to the corresponding coordinates of the points in the fingerprint. For example this may be done by approximating that the device is located at the coordinates of the data point having the closest matching signal measurements, or by interpolating between the coordinates of a subset of the data points having signal measurements most closely matching those currently experienced by the device. The fingerprint can be pre-trained in a dedicated training phase before the fingerprint is deployed by systematically placing a test device at various different locations in the environment. Alternatively or additionally, the fingerprint can built up dynamically by receiving submissions of signal measurements experienced by the actual devices of actual users in an ongoing training phase.

The determination of the mobile device's location may be performed according to a "device-centric" approach or a "network-centric" approach. According to a device centric approach, each anchor or reference node emits a respective signal which in some cases may be referred to as a beacon signal. The mobile device takes measurements of signals it receives from the reference nodes, and also obtains assistance data for those nodes from the location server, wherein the assistance data comprises the respective locations of the nodes in question. The mobile device can then perform the calculation at the mobile device itself, to determine its own location. According to a network-centric approach on the other hand, the reference nodes are used to take measurements of signals received from the mobile device, and an element of the network such as the location server performs the calculation to determine the mobile device's location. Hybrid approaches are also possible, e.g. where the mobile device takes the raw measurements but forwards them to the location server to calculate its location.

There are various reasons why it may be desirable to be able to detect the location of a wireless device, such as to provide location based services. For instance, one application of a positioning system is to automatically provide a wireless mobile device with access to control of a utility such as a lighting system, on condition that the mobile device is found to be located in a particular spatial region or zone associated with the lighting or other utility. E.g. access to control of the lighting in a room may be provided to a wireless user device on condition that the device is found to be located within that room and requests access. Once a wireless user device has been located and determined to be within a valid region, control access is provided to that device via a lighting control network. Other examples of location based services or functionality include indoor navigation, location-targeted advertising, service alerts or provision of other location-related information, user tracking, asset tracking, or taking payment of road tolls or other location dependent payments.

SUMMARY OF THE INVENTION

With an increasing prevalence of localization systems such as indoor positioning systems that can precisely locate individuals, privacy is an important consideration. Based on the different positioning approaches available, device-centric is more privacy-preserving than hybrid and network-centric approaches since the location is computed on the mobile device.

However the disadvantage of device-centric approach is the need for assistance data, typically at least comprising the locations of the reference nodes to be used in the location calculation being performed by the mobile device. For example, the respective beacon signal from each node may comprise a respective ID of the node, which the mobile device uses to look up the respective location of that node in a location database. For this whole database to be available offline which may be storage intensive for a typical mobile device, and/or may be impractical in terms of maintaining a record of the most up-to-date data for the whole location network. On the other hand, if the mobile device makes continual requests to the location server for assistance data based on the beacon IDs, this will inadvertently reveal the location of the mobile device to the location server and therefore undermine privacy.

The following provides a technique for mitigating this problem, by using an alternative coarse positioning system to determine what assistance data shall be sent to the mobile device for performing its localization.

According to one aspect disclosed herein, there is provided a controller for assisting in determining a location of a mobile device based on a first location estimation performed using a first location system, the first location system comprising a first network of wireless reference nodes. The controller is configured to do this by performing operations of: obtaining an initial estimate of the location of the mobile device based on a second location estimation coarser than the first location estimation (e.g. based on a second location system); using the initial estimate to select a subset of the reference nodes of the first network, the subset being selected based on being within a defined vicinity of the location of the mobile device as determined from the initial estimate; and, from amongst a database of respective assistance data for each of the reference nodes of the first network stored on a server of the first location system, selectively providing the respective assistance data for said subset of wireless reference nodes to a localization module on the mobile device, for the localization module of the mobile device to calculate a finer estimate of the location of the mobile device by performing the first location estimation based on signals communicated between the mobile device and some or all of said subset of nodes, and on the respective assistance data for said some or all of the subset of reference nodes.

This controller may be implemented in the server of the first location system (in which case said selective provision of the assistance data comprises selectively reporting the respective assistance data for each of said subset of wireless reference nodes from the server of the first location system to the mobile device). Alternatively the controller may be implemented in the mobile device (in which case said selective provision of the assistance data comprises selectively requesting the respective assistance data for each of said subset of wireless reference nodes from the server of the first location system, based on the initial estimate).

Either way, advantageously, the mobile device is not required to store the entire database of assistance data locally at the mobile device; but also, the location server of the first network does not receive individual requests for the assistance data of individual nodes. Rather, the location server of the first location system only sees a request for a subset of nodes (in embodiments more than required for the first location estimation such that only some of the subset are used in the first, finer location estimation). This subset is based on a coarse estimate of the mobile device's location, and so the subset covers too coarse an area for the location server of the first location system to be able to infer the exact location of the mobile device from the assistance data being requested.

The first location estimation and/or second location estimation may comprise a trilateration, triangulation, multilateration and/or fingerprinting based on the signals communicated between the mobile device and said some or all of the subset of reference node. Preferably, the respective assistance for each of the reference nodes comprises a respective location of each of the reference nodes.

In embodiments, the first network may take the form of an indoor location network. The first network may be a dedicated location network.

The second location estimation may be obtained using a second location system comprising a second network of wireless reference nodes. This second network may be a separate, dedicated location network (e.g. a separate indoor location network). Alternatively, the second network may have a primary function other than localization (e.g. the second network may comprise pre-existing mobile cellular network having the primary function of enabling mobile phone calls, and/or a network of wireless access points having the primary function of providing wireless access to the Internet).

As another alternative, the second network may comprise a virtual second network consisting of some or all of the first network of wireless reference nodes, e.g. a more coarsely spaced spattering of the first nodes. In embodiments, the second location estimate may be performed using one or more of the nodes of the first location network, but fewer of the nodes than a minimum required to perform the first location estimation. E.g. said one or more nodes may broadcast an indication of a region within which the one or more nodes are located, said indication being interpretable by the controller on the mobile device without any of the assistance data from the first server (a region or area code that can be looked up in the second server, or an explicit indication of the location embedded in the broadcast itself). In this case the second location estimation may comprise determining that the mobile device is located in said region based on the mobile device receiving (and interpreting) said indication.

In embodiments, the second location estimation is performed by a server of the second location system, and said obtaining of the initial estimate comprises receiving the initial estimate from the server of the second location system. Alternatively, the second location estimation may be performed by said controller (at the mobile device or the server of the first location system).

In further embodiments, different area coverage assistance data can be requested, e.g. based on the privacy expectation and the storage available. Hence in embodiments, the controller is configured to allow the mobile device to choose the coarseness of the second location estimation and/or a size of said vicinity.

In embodiments, the server of first location system applies a policy limiting to a maximum number of the wireless reference nodes that assistance data can be obtained for per request (from the mobile device or server of the second location system). The location server of the first location system may also advertise the maximum assistance data that it will provide per request, providing mobile users with a mechanism to decide if they wish to use a particular location server that fulfills their privacy needs.

According to another aspect disclosed herein, there may be provided a method of determining a location of a mobile device based on a first location estimation performed using a first location system, the first location system comprising a first network of wireless reference nodes, and the method comprising: obtaining an initial estimate of the location of the mobile device based on a second location estimation coarser than the first location estimation; using the initial estimate to select a subset of the reference nodes of the first network, the subset being selected based on being within a defined vicinity of the location of the mobile device as determined from the initial estimate; and, from amongst a database of respective assistance data for each of the reference nodes of the first network stored on a server of the first location system, selectively providing the respective assistance data for each of said subset of wireless reference nodes to a localization module on the mobile device, for the mobile device to calculate a finer estimate of the location of the mobile device by performing the first location estimation based on signals communicated between the mobile device and some or all of said subset of reference nodes, and on the respective assistance data for said some or all of the subset of reference nodes.

In embodiments, the method may comprise further operations in accordance with any of the mobile device, server or system features disclosed herein.

According to another aspect disclosed herein, there may be provide a computer program product for assisting in determining a location of a mobile device based on a first location estimation performed using a first location system, the first location system comprising a first network of wireless reference nodes, and the computer program product comprising code embodied on a computer readable medium and/or being downloadable therefrom, configured so as when executed to perform operations of: obtaining an initial estimate of the location of the mobile device based on a second location estimation coarser than the first location estimation; using the initial estimate to select a subset of the reference nodes of the first network, the subset being selected based on being within a defined vicinity of the location of the mobile device as determined from the initial estimate; and, from amongst a database of respective assistance data for each of the wireless reference nodes of the first network stored on a server of the first location system, selectively providing the respective assistance data for each of said subset of wireless reference nodes to a localization module on the mobile device, for the mobile device to calculate a finer estimate of the location of the mobile device by performing the first location estimation based on signals communicated between the mobile device and some or all of said subset of reference nodes, and on the respective assistance data for said some or all of the subset of reference nodes.

In embodiments, the computer program product may be configured to perform further operations of any of the mobile device, server or system features disclosed herein.

BRIEF DESCRIPTION OF THE DRAWINGS

To assist the understanding of the present disclosure and to show how embodiments may be put into effect, reference is made by way of example to the accompanying drawings in which.

DETAILED DESCRIPTION OF PREFERRED EMBODIMENTS

Figure 1:
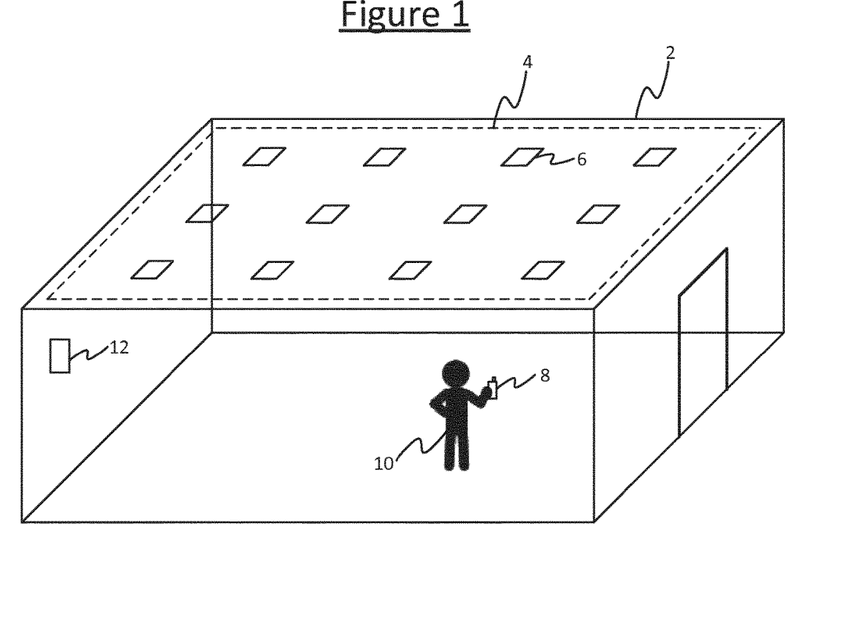
FIG. 1 is a schematic representation of an environment comprising an indoor positioning system.

FIG. 1 illustrates an example of a positioning system installed in an environment 2 according to embodiments of the present disclosure. The environment 2 may comprise an indoor space comprising one or more rooms, corridors or halls, e.g. of a home, office, shop floor, mall, restaurant, bar, warehouse, airport, station or the like; or an outdoor space such as a garden, park, street, or stadium; or a covered space such as a marquee; or any other type of enclosed, open or partially enclosed space such as the interior of a vehicle like a ship or train. By way of illustration, in the example of FIG. 1 the environment 2 in question comprises an interior space of a building.

The positioning system comprises a location network 4, comprising multiple reference nodes in the form of anchor nodes 6 each installed at a different respective fixed location within the environment 2 where the positioning system is to operate. For the sake of illustration FIG. 1 only shows the anchor nodes 6 within a given room, but it will be appreciated that the network 4 may for example extend further throughout a building or complex, or across multiple buildings or complexes. In embodiments the positioning system is an indoor positioning system comprising at least some anchor nodes 6 situated indoors (within one or more buildings), and in embodiments this may be a purely indoor positioning system in which the anchor nodes 6 are only situated indoors. Though in other embodiments it is not excluded that the network 4 extends indoors and/or outdoors, e.g. also including anchor nodes 6 situated across an outdoor space such as a campus, street or plaza covering the spaces between buildings.

In yet further embodiments the reference nodes 6 need not necessarily be installed at fixed locations or be dedicated anchor nodes of an indoor positioning system, as long as their locations can still be known. For example the reference nodes could instead be access points 12 of a WLAN or base stations of a cellular network used for a secondary purpose of positioning, or could be other mobile devices that have already been positioned. The following will be described in terms of the reference nodes 6 being anchor nodes of an indoor positioning system or the like, but it will be appreciated this is not necessarily the case in all possible embodiments.

Also, while the disclosure is described in terms of wireless radios, the disclosed techniques may be applied to other signal media such as visible light (e.g. coded light), or ultrasound or other acoustic waves, etc. For instance, in the case of coded light, this comprises a signal modulated into the visible light at a frequency that is substantially imperceptible to the human eye. In such cases, one possibility is that some or all of the anchor nodes 6 each comprise a luminaires emitting light for a primary purpose illuminating the environment 2, with an imperceptible coded light component being embedded the illumination for a secondary purpose of location beaconing. One example of a coded light protocol is IEEE802.15. In coded light navigation systems, the light beacons have similar functions, and are even better localized, generally to rooms; and thus the reception of a coded light beacon identifier provides a good indication of the mobile device's position. The following will be described by way of example in terms of radio beacons, but it will be appreciated that this is not limiting and other carrier media such as coded light may alternatively or additionally be used.

The environment 2 is occupied by a user 10 having a wireless device 8 disposed about his or her person (e.g. held in a hand, or carried or in a bag or pocket). The wireless device 8 takes the form of a mobile user terminal such as a smart phone or other mobile phone, a tablet, or a laptop computer. At a given time, the mobile device 8 has a current physical location which may be determined using the location network 4. In embodiments, it may be assumed that the location of the mobile device 8 is substantially the same as the location of the user 10, and in determining the location of the device 8 it may in fact be the location of the user 10 that is of interest. Another example would be a mobile tracking device disposed about a being or object to be tracked, e.g. attached to the object or placed within it. Examples would be a car or other vehicle, or a packing crate, box or other container. The following will be described in terms of a mobile user device but it will be understood this is not necessarily limiting in all embodiments and most generally the device 8 may be any wireless device having the potential to be found at different locations or an as-yet unknown location to be determined. Further, the location of the mobile device 8 may be referred to interchangeably with the location of the associated user 10, being or object about which it is disposed.

Figure 2:
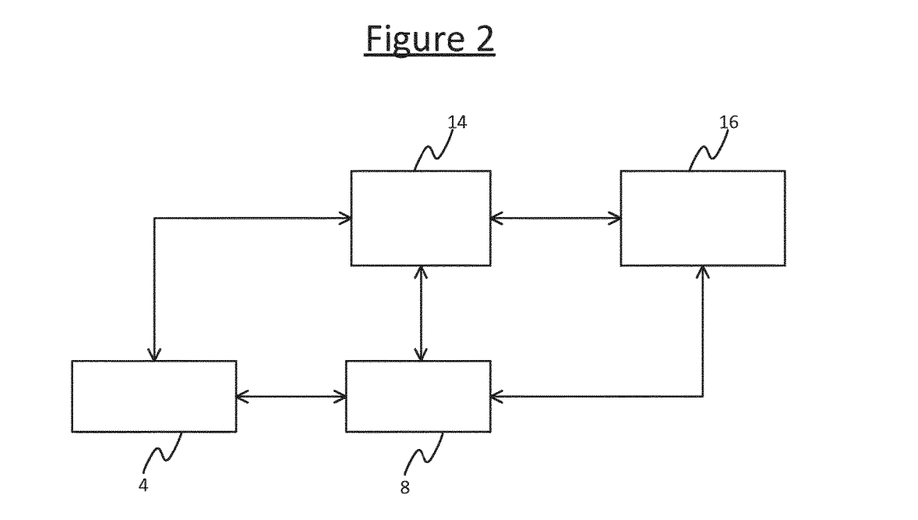
FIG. 2 is a schematic block diagram of a system for providing a location based service.

Referring to FIGS. 1 and 2, in embodiments, the environment 2 may also comprise at least one wireless access point or router 12 enabling communication with a location server 14 (comprising one or more server units at one or more sites). The one or more wireless access points 12 are placed such that each of the anchor nodes 6 is within wireless communication range of at least one such access point 12. The following will be described in terms of one access point 12, but it will be appreciated that in embodiments the same function may be implemented using one or more access points 12 and/or wireless routers distributed throughout the environment 2. The wireless access point 12 is coupled to the location server 14, whether via a local connection such as via a local wired or wireless network, or via a wide area network or internetwork such as the Internet. The wireless access point 12 is configured to operate according to a short-range radio access technology such as Wi-Fi, Zigbee or Bluetooth, using which each of the anchor nodes 6 is able to wirelessly communicate via the access point 12 and therefore with the location server 14. Alternatively it is not excluded that the anchor nodes 6 could be provided with a wired connection with the location server 14, but the following will be described in terms of a wireless connection via an access point 12 or the like.

In embodiments, the mobile device 8 is also able to communicate via the wireless access point 12 using the relevant radio access technology, e.g. Wi-Fi, Zigbee or Bluetooth, and thereby to communicate with the location server 14. Alternatively or additionally, the mobile device 8 may be configured to communicate with the location server 14 via other means such as a wireless cellular network such as a network operating in accordance with one or more 3GPP standards. Furthermore, the mobile device 8 is able to wirelessly communicate signals directly to and/or from any of the anchor nodes 6 that happen to be in range, at least for the purpose of localization. In embodiments this communication may be implemented via the same radio access technology as used to communicate with the access point 12, e.g. Wi-Fi, Zigbee or Bluetooth, though that is not necessarily the case in all possible embodiments, e.g. the anchor nodes 6 may alternatively broadcast to the mobile device 8 on some dedicated localization radio technology.

Generally any of the communications described in the following may be implemented using any of the above options or others for communicating between the respective entities 6, 8, 12, 14 and for conciseness the various possibilities will not necessarily be repeated each time.

The signals between the anchor nodes 6 and the mobile device 8 are the signals whose measurements are used to determine the location of the mobile device 8. In a device centric approach the anchor nodes 6 each broadcast a signal and the mobile device 8 listens, detecting one or more of those that are currently found in range and taking a respective signal measurement of each. Each anchor node 6 may be configured to broadcast its signal repeatedly, e.g. periodically (at regular intervals). The respective measurement taken of the respective signal from each detected anchor node 6 may for example comprise a measurement of signal strength (e.g. RSSI), time of flight (ToF), angle of arrival (AoA), and/or any other property that varies with distance or location.

In a network centric approach, the mobile device 8 broadcasts a signal and the anchor nodes 6 listen, detecting an instance of the signal at one or more of those nodes 6 that are currently in range. In this case the mobile device 8 may broadcast its signal repeatedly, e.g. periodically (at regular intervals). The respective measurement taken of each instance of the signal from the mobile device 8 may comprise a measure of signal strength (e.g. RSSI) or time of flight (ToF), angle of arrival (AoA), and/or any other property that varies with distance or location. In an example of a hybrid approach, the nodes 6 may take the measurements but then send them to the mobile device 8, or the mobile device 8 may take the measurements but send them to the location server 14.

There are various options for the manner in which such measurements are started and conducted. For example, either the mobile device may initiate the transmission upon which the measurement is based, or the network may initiate the transmission. Both are possible, but it may have some impact how the rest of the process is implemented, in particular for time-of-flight measurements. Time-of-flight measurements can be obtained by establishing either a one way transmission delay or a two-way transmission delay (round trip time, RTT). A measurement of one-way delay can suffice if all relevant elements in the network have a synchronized clock or can reference a common clock. In this case the mobile device 8 may initiate the measurement with a single message transmission, adding a timestamp (e.g. time or time and date) of transmission to the message. If on the other hand the measurement is not based on a synchronized or common clock, the anchor or reference nodes 6 can still perform a measurement by bouncing individual messages back from the mobile device 8 and determining the round-trip time-of-flight. The latter may involve coordination from the nodes attempting to measure.

In the case of signal strength measurements, there are also different options for implementing these. The determination of distance from signal strength is based on the diminishment of the signal strength over space between source and destination, in this case between the mobile device 8 and anchor or reference node 6. This may for example be based on a comparison of the received signal strength with a-prior knowledge of the transmitted signal strength (i.e. if the nodes 6 or mobile device 8 are known or assumed to always transmit with a given strength), or with an indication of the transmitted signal strength embedded in the signal itself, or with the transmitted signal strength being communicated to the node 6 or device 8 taking the measurement via another channel (e.g. via location server 14).

Any one or a combination of these approaches or others may be applied in conjunction with the system disclosed herein. Whatever approach is chosen, once such a signal measurement is available from or at each of a plurality of the anchor nodes 6, it is then possible to determine the location of the mobile device 8 relative to the location network 4 using a technique such as trilateration, multilateration, triangulation and/or a fingerprint based technique.

In addition, the "absolute" locations of the anchor nodes 6 (or more generally reference nodes) are known, and stored as assistance data in a location database maintained by the location server 14. The absolute location is a physical location of the node in a physical environment or framework, being known for example in terms of a geographic location such as the location on a globe or a map, or a location on a floorplan of a building or complex, or any real-world frame of reference.

By combining the relative location of the mobile device 8 with the known locations of the anchor nodes 6 used in the calculation, it is then possible to determine the "absolute" location of the mobile device 8. Again the absolute location is a physical location of the device in a physical environment or framework, for example a geographic location in terms of the location on a globe or a map, or a location on a floorplan of a building or complex, or any more meaningful real-world frame of reference having a wider meaning than simply knowing the location relative to the location network 4 alone.

In embodiments, the absolute location of the nodes 6 may be stored in a human understandable form and/or the absolute location of the mobile device 8 may be output in a human understandable form. For example, this may enable the user 10 to be provided with a meaningful indication of his or her location, and/or may enable the administrator of a location-based service to define rules for granting or prohibiting access to the service or aspects of the service. Alternatively it is possible for the location of the nodes 6 and/or mobile device 8 to only ever be expressed in computer-readable form, e.g. to be used internally within the logic of the location based service.

In a device centric approach the mobile device 8 looks up the locations of the relevant nodes 6 by querying the location server 14 (e.g. via the wireless access point 12), or alternatively may receive the respective location along with the signal from each node 6. The mobile device 8 then performs the calculation to determine its own location at the device 8 itself (relative to the location network 4 and/or in absolute terms). In a network centric approach on the other hand, the nodes 6 submit the signal measurements they took to the location server 14 (e.g. via the wireless access point 12), and the location server 14 performs the calculation of the device's location at the server 14 (again relative to the location network 4 and/or in absolute terms). In an example of a hybrid approach, the mobile device 8 may take the measurements of signals from the nodes 6 but submit them to the location server 14 in a raw or partially processed form for the calculation to be performed or completed there.

Typically a signal measurement is needed from at least three reference nodes, though if other information is taken into account then it is sometimes possible to eliminate impossible or unlikely solutions based on two nodes. For example, if the location is assumed to be constrained to a single level (e.g. ground level or a given floor of a building), the measurement from any one given node 6 defines a circle of points at which the mobile device 8 could be located. Two nodes give two circles, the intersection of which gives two possible points at which the mobile device 8 may be located. Three nodes and three circles are enough to give an unambiguous solution at the intersection of the three circles (though more may be used to improve accuracy). However, with only two nodes, sometimes it may be possible to discount one of those points as being an unlikely or impossible solution, e.g. being a point in an area to which the user 10 does not have access or it is impossible to reach, or a point that is not consistent with a plotted trajectory (path) of the user 10 (elimination by "dead reckoning"). Similar comments may be made in relation to three-dimensional positioning: strictly four nodes defining four spheres are required to obtain an unambiguous solution, but sometimes an estimate may be made based on fewer nodes if additional information can be invoked. Assuming the user 10 is constrained to a particular level to constrain to a two-dimensional problem is an example of such information. As another example, it may be assumed the user 10 is found on one of a plurality of discrete floors, and/or a dead reckoning type approach may be used to eliminate unlikely jumps in the user's route.

Note that FIG. 2 shows arrows in all directions to illustrate the possibility of either device centric or network centric approaches. Network centric, device centric and hybrid approaches are described by way of comparison, but the present disclosure relates specifically to a mobile centric approach where at least the final location calculation is performed at the mobile device 8 instead of the location server 14 of the main location system.

Privacy is becoming an increasingly important issue in these indoor localization systems since users' behaviour can be continuously tracked based on where they visit, when they visit these locations, and how long they stay in a particular location (e.g. a particular indoor location). Therefore consumers and government regulators have increasingly expressed the need to limit automated means of localization. A network-centric approach to localization is one such example where users cannot easily restrict when they are localized and for what purpose.

On the other hand, device-centric positioning systems provide more control to users in terms of when they are positioned, and allowing the server 14 access to their location. However there are two subclasses of device-centric positioning: an assisted implementation and an independent implementation. For a mobile device 8 to localize in a device-centric manner, it requires assistance data which for example comprises details about the position of the reference nodes 6 (so that the mobile device 8 can translate the position calculated relative to the nodes 6 into an "absolute" position in some other frame of reference, as discussed above).

The main component of assistance data in the following described embodiments is the required information for calculating position based on the localization algorithm being used, and hence the assistance data will comprise at least the position of the reference nodes 6 (for trilateration or trilateration algorithms or the like) or the fingerprinting data (for fingerprint based algorithms). However, it will be appreciated that this is not necessarily limiting to all possible embodiments. Optionally other assistance data can be present depending on how the assistance is handled, for example if caching at the mobile device 8 is involved, the assistance data for each node 6 could comprise versioning and/or expiration data (such as an expiration date and/or time), specifying a restricted period in which the mobile device is allowed to use a beacon signal from the respective node. Another example would be authorization data specifying which mobile devices 8 are entitled to use the beacon signal from the respective node 6 for localization, such as a certain authorization level required by the mobile device to use the respective beacon signal. In some cases, it could even be that the mobile device 8 already knows the positions of the reference nodes 6, but only requires one or more such other types of assistance data to complete the location estimation.

Whatever assistance data is required for the system in question, either the mobile device 8 can request the assistance data from the location server 14 based on the identifiers of the reference nodes 6 being measured, or use an offline database on the mobile. A server-assisted implementation requires the mobile device 8 to look up the assistance data from the location server 14, while an independent implementation uses only a database of such information stored locally on the mobile device.

These variants provide different levels of privacy. In the assisted case, the mobile device 8 needs to actively use the location server 14 in order to be able to compute the final location, and therefore the location server 14 can potentially infer the location of the mobile device 8, even if the user does not wish to disclose it, based on the locations of the nodes 6 for which assistance data is being requested. The fully independent case on the other hand provides a higher level of privacy, since the location is calculated without necessarily deferring to the location server 14 at all, and the position is only released to an external service 16 if desired (if not, the calculated position can still be used directly on the mobile device 8 with offline maps etc.). However, although this provides more privacy, there are other disadvantages in terms of data transfer requirements, storage space on the mobile device 8 and/or freshness of the assistance data if the network of reference nodes 6 has changed (e.g. if one or more nodes have been moved, added or removed). It also makes such data vulnerable to being stolen for use by competitors.

Figure 3:
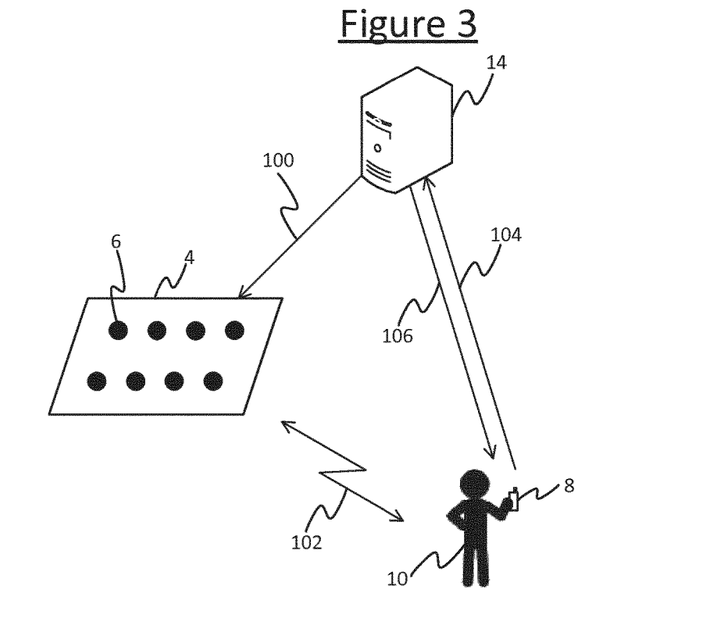
FIG. 3 is a schematic diagram of a positioning system comprising a first location network.

FIG. 3 illustrates a typical device centric, assisted localization. At step 100, the location server 14 sends location network configurations to the network 4 of reference nodes 6. This step may be performed in an initial commissioning step, and/or may be an ongoing process of keeping the nodes 6 up to date. This may be as simple as setting an ID for each node 6.

At step 102, the mobile device reads the IDs of a plurality of the nodes 6 from the signals received from those nodes, as well as measuring a property of these signals such as the RSSI. Based on the IDs, at step 104 the mobile device 8 requests the appropriate assistance data from the location server 14. In response, at step 106 the location server 14 reports the requested assistance data back to the mobile device 8, and the mobile device 8 calculates its own location based on the collected signal measurements and node locations reported from the server 14.

Even though the position is calculated on the mobile device 8 based on the measurements and assistance data, the fact that assistance data was requested for particular the IDs of particular reference nodes 6 already provides a good estimate of the position of the mobile device 8 to the location server 14. On the other hand, doing away with the server 14 completely would be impractical because storing all the assistance data offline is quite inefficient in terms of mobile storage space. Therefore assistance data is only provided for the node IDs that are needed. Other reasons not to provide the complete assistance database to the mobile are that the assistance needs to be up-to-date, and because it would be desirable to prevent this valuable data being leaked to the public or competitors.

The following provides a technique for preserving privacy in an assisted device-centric positioning system in an efficient way that does not require all assistance data to be stored offline on the mobile device 8, but also does not make it easy for the location server 14 to infer a clear location of the mobile device 8 from the assistance data being requested.

Figure 4:
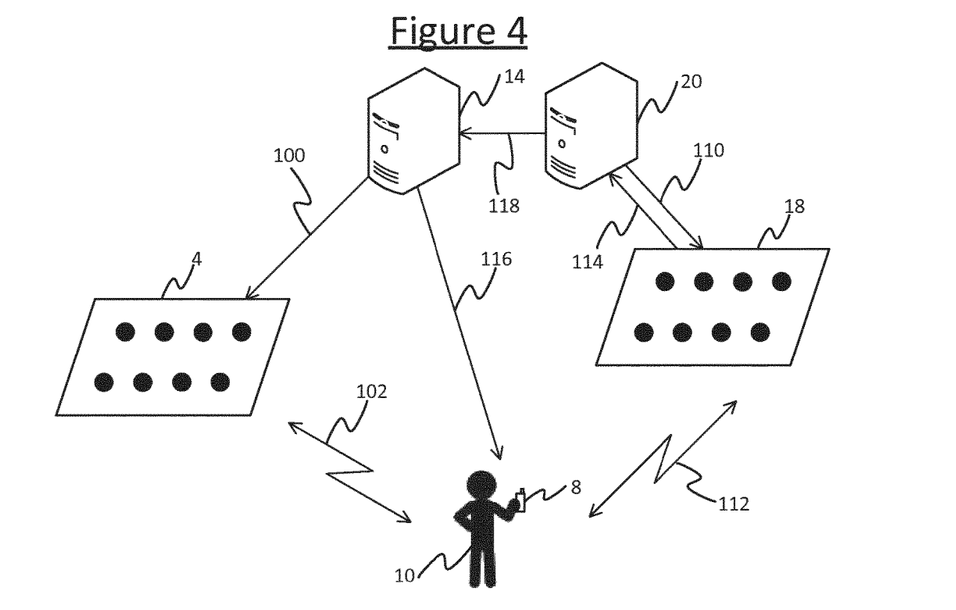
FIG. 4 is a schematic diagram of an arrangement comprising a first and a second location system.
Figure 5:
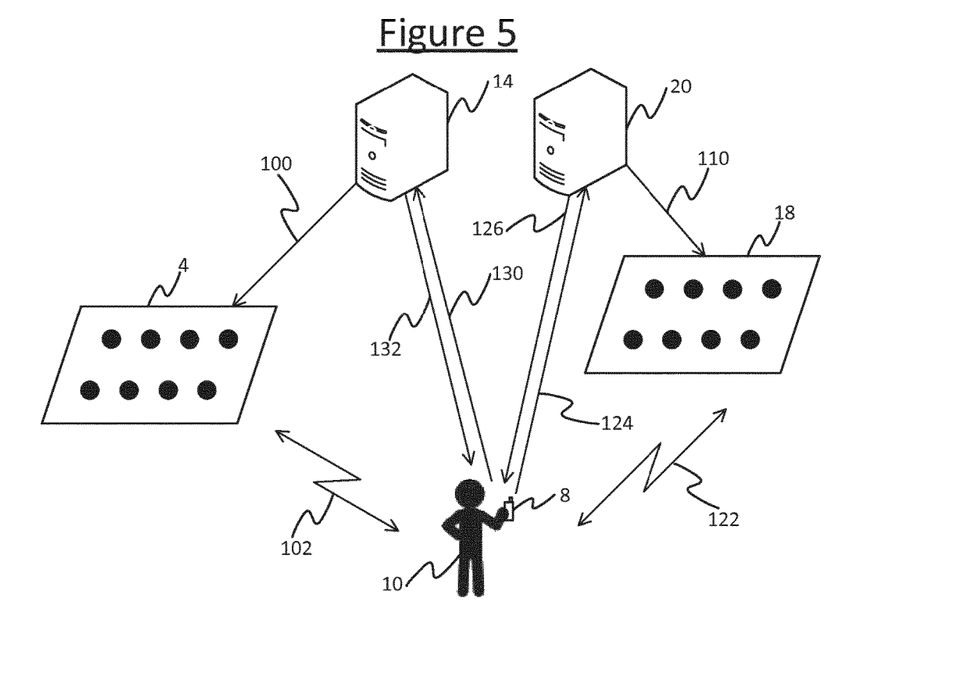
FIG. 5 is a schematic diagram of another system comprising first and second location systems.

As illustrated in FIGS. 4 and 5, in addition to the main (first) location system 4, 14 the modified technique in accordance with embodiments of the present disclosure makes use of an alternative coarse location system 18, 20 operating within the same environment (e.g. same indoor space). This second location system 18, 20 provides a coarse positioning of the mobile device 8, coarser than the positioning provided by the first location system 4, 14.

The coarse location provided by the second (auxiliary) location system 18, 20 is used to identify some or all of those reference nodes 6 of the first location system 4, 14 within a certain vicinity relative to the mobile device 8. The location server 14 of the first (main) location system provides assistance data for these reference nodes 6 of the first network to the mobile device 8 in response to a combined request from the mobile device 8 or from the server 20 of the second location system based on the coarse location as determined using the second location system 18, 20, instead of the mobile device 8 submitting individual IDs of the reference nodes 6 it requires assistance data for.

In embodiments, the second location system comprises a second location server 20 in communication with the reference nodes of the second network 18. The second server 20 is at least a separate logical server, which may run on one or more of the same server units as the first server 14, or one or more separate server units.

Like the reference nodes 6 of the first network 4, the reference nodes of the second location network 18 are also operable to communicate signals to and/or from the mobile device 8, at least for the purpose of localization. Similar communication options as discussed in relation to the first system 4, 8, 14 (Wi-Fi, ZigBee etc.) may apply for these communications the between elements 8, 18, 20 involved in the second system, or other options may be used (e.g. a near-field communication, NFC, technology such as RFID tags); and the means of implementing any of the communications in the first system 4, 8, 14 may be the same as or different than any of those implementing any of the communications in the second system 8, 18, 20. Also the means of performing the localization (triangulation, trilateration, multilateration and/or fingerprinting based on measurements such as received signal strength, time of flight and/or angle of arrival) may be the same or different for the first and second location systems. E.g. as the second location system performs a coarser location estimate, it may work simply by detecting which node of the second network 18 the mobile device 8 is closest to.

The second location system 18, 20 may be a dedicated location system comprising a separate network 18 of second reference nodes introduced for the purpose of obtaining the coarse location of the mobile device 8. For instance the second location network 18 may comprise a network of RF-ID tags which the mobile device can swipe to determine an ID of the tag it is next to. The mobile device 8 can then look up the ID of the tag in a database mapping the tag IDs to locations of the respective tags (e.g. by accessing this database from the second server 20, or from local storage on the mobile device 8). Alternatively the tag could indicate its location explicitly in the signal it conveys (i.e. not requiring a look-up), e.g. a label such as "Home furnishings department, Bob's Megastore" in some format understandable to the mobile device 8 such as a text string (so this could also be human readable). Either way, the mobile device 8 then estimates the coarse location of the mobile device as being the location of the swiped tag, at least for a time, e.g. until the mobile device 8 next swipes another tag of the second network 18, or perhaps until an expiry time expires. Similar techniques could be employed using a second network of other types of short-range reference nodes (not just RF tags or other such NFC nodes), e.g. Bluetooth, coded light or IR beacons.

Another possibility is that the dedicated second system 18, 20 enables the mobile device to be localized in a similar manner to the first system 4, 14, such as based on triangulation, trilateration, multilateration or fingerprinting performed at the second server 20; but with this estimation being coarser than that performed by the first, e.g. because the nodes of the second network 18 are substantially more sparsely populated than the nodes of the first network 4, or because the location calculation is deliberately hamstrung at the second server (deliberately restricted to a substantially coarse quantization).

Alternatively, rather than the second network 18 being a separate network, the second location network 18 may be a virtually separate location network which in fact is made up of some or all of the same physical reference nodes 6 as the first network 4. In this case the second location system may use a different system of identifiers of the nodes 6 than the first system 4, 14. For example, each node 6 that is also to act as a node of the second location network may be additionally allocated (in addition to the ID used for the first location system 4, 14) a secondary ID, such as a label a human readable label, which unique amongst the nodes of the second network. For example, the node could emit as separate ID that the mobile device 8 can look up in a database stored on the second server 18 or a local database on the mobile device 8, to look up the coarse location of the node of the second node, or the location of the respective node could be signaled explicitly in the signals from the nodes of the second network 18.

Similar options as discussed in relation to the dedicated network could apply: e.g. the mobile device may simply determine which node of the second network 18 it is closest to and take that node's location as a coarse estimation of the mobile's own location. E.g. each node of the second network 18 may be allocated a label such as "home furnishings, Bob's Megastore" which is understandable to the mobile device 8 (and optionally also a human). Also a human readable label can be displayed on the mobile device 8 to the user, so there is a dual function. Alternatively instead of using and beacon ID and a human readable label, the first and second systems together could implement an address hierarchy; e.g. like in an IP address or similar, where the most-significant portion of the indicate the general area so as to provide the second coarser system 18, 20, and the least-significant portion indicates the precise beacon ID needed for the first, finer system 4. E.g. the address could take the form 14: 123.253.102.xxx, where the first part is used as the "coarse" identifier to get the translation of the last "xxx" nodes 6.

Or again, another possibility is that the second system 18, 20 enables the mobile device to be localized in a similar manner to the first system 4, 14, such as based on triangulation, trilateration, multilateration or fingerprinting performed at the second server 20; but with this estimation being coarser than that performed by the first, e.g. because only a sparse subset of the nodes 6 are used for the virtual second network 18, or because the location calculation is deliberately hamstrung at the second server 20.

As yet another alternative, the second location system may be separate from the first network 4, and may be a pre-existing system that is exploited for the purpose of obtaining a coarse location of the mobile device 8, whether pre-existing for the purpose of localization or another purpose. For instance, the nodes of the second location network 18 could comprise base stations (cell towers) of a mobile cellular network whose main purpose is making mobile phone calls, sending SMS message and the like; and/or wireless access points such as Wi-Fi access points whose main purpose is providing wireless access to the Internet.

The coarse localization provided by the second localization network may be implemented in a network-centric manner of a device-centric manner.

Figure 6:
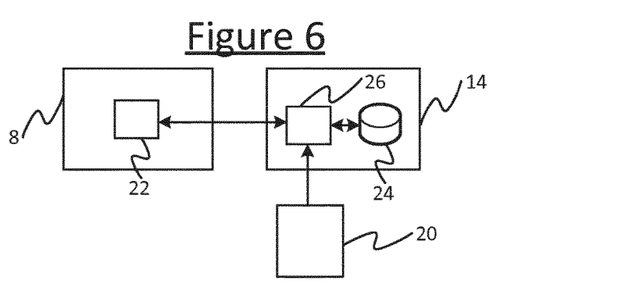
FIG. 6 is a schematic block diagram of an arrangement comprising a first and a second location system.

A network-centric approach to the second location system is illustrated in FIGS. 4 and 6. Here, the selection as to which reference nodes 6 of the first network 4 to report assistance data for is made by a controller 26 implemented at the server 14 of the first location system, and the selected assistance data is reported from the server 14 of the first location network 4 to a localization module 22 on the mobile device 8. These modules could be implemented in software stored and arranged to run at the server 14 and mobile device 8 respectively, or could be implemented in hardware, or any combination of hardware and software.

At step 110, the location server 18 of the second location system sends location network configurations to the reference nodes of the second location network 20. This comprises allocating the IDs or labels (e.g. "Home furnishings, Bob's Megastore") to each node of the second location network 18. Like step 100, this step may be performed in an initial commissioning step, and/or may be an ongoing process of keeping the nodes 6 up to date. In embodiments this could be part of the same step as step 100 (e.g. where a system of hierarchical addresses are used), or it could be a separate step.

At step 112, a one or more reference nodes of the second location network 18 receive a signal emitted from the mobile device 8, and take a measurement of that signal such as its received signal strength, time of flight and/or angle of arrival. At step 114, the relevant node(s) of the second network 18 transmit(s) these one or more measurements to the server 20 of the second location system, which uses these to determine a coarse location estimate for the current location of the mobile device 8. For example, the server 20 could perform a triangulation, trilateration, multilateration and/or fingerprinting type location estimation, but then output the result to a lower resolution than it was calculated, or adding a deliberate error. Alternatively the server 20 of the second location system could perform its location estimation based on an alternative type of localization technology or modality that, by its nature, is intrinsically coarser that that used by the first location system 4, 14, e.g. by simply detecting which of the nodes of the second location network 18 the mobile device 8 is closest to, and taking that node's location as the coarse estimate of the mobile device's location. Alternatively or additionally, the first location network 4 could operate based on RF signals while the second location network 18 is based on coded light. Note that the coarse location estimation may be coarser than the ultimate fine estimation by in any way having a substantially greater error, or lower resolution, granularity, precision or accuracy.

At step 118, the location server 20 of the second location system sends the coarse location estimate to the server 14 of the first location system. This communication could be by any means such as over the Internet, or via a local wired or wireless network in the environment 2.

The server 14 of the first location system comprises a database 24 storing the assistance data for each of the wireless reference nodes 6 of the first location network 4. At step 116, the controller 26 at the server 14 of the first location system then uses the coarse location provided by the second location system 18, 20 to identify those reference nodes 6 of the first location system 4, 14 within a certain defined vicinity relative to the mobile device 8, whether within a predetermined vicinity or dynamically determined vicinity. This may be defined in any way based on the coarse location estimate for the mobile device 8, such as by being within a certain radius of the coarse location estimate, within a certain distance along a path relative to the coarse location estimate, or on the basis of being within a same building, room or zone as the mobile device 8. The controller 26 at the location server 14 of the first system now looks up, from amongst the date in its database 24, the assistance data for all the selected nodes 6 of the first network 4, and reports this selected assistance data to the mobile device 8. The mobile device 8 can then use the received assistance data, along with the measurements that the mobile device 8 itself has taken from the reference nodes 6 of the first location network 4 (step 102), to compute its own location (to a finer degree than the coarse estimate provided by the second location system 18, 20).

Figure 7:
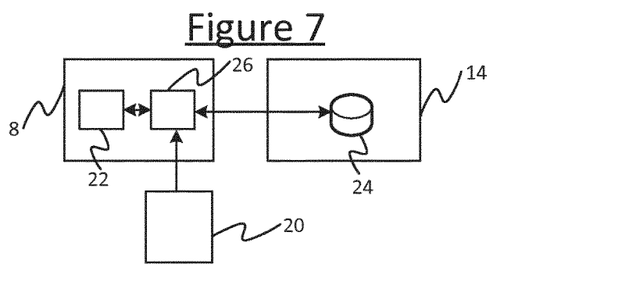
FIG. 7 is a schematic block diagram of another arrangement comprising first and second location systems.

An alternative, device-centric approach to the second location system is illustrated in FIGS. 5 and 7. Here, the selection as to which reference nodes 6 of the first network 4 to retrieve assistance data for may be made by a controller 26 implemented on the mobile device 8, with the selected assistance data being retrieved from the server 14 of the first location network 4 to the mobile device 8, for input to the localization module 22 on the mobile device 8. Again these modules could be implemented in software stored and arranged to run at the server 14 and mobile device 8 respectively, or could be implemented in hardware, or any combination of hardware and software.

At step 122, the mobile device 8 receives signals from one or more of the reference nodes of the second location network 18, and takes a measurement of each signal such as its received signal strength, time of flight and/or angle of arrival. At step 124, the mobile device 8 accesses the second location server 20 to look up assistance data (e.g. the respective location(s)) of the relevant reference node(s) of the second location network 18, and at step 126 the server 20 of the second system returns this data to the mobile device 8. The location module 22 on the mobile device 8 can then determine its coarse location based on the one or more measurements taken from the nodes of the second location network, along with the location(s) looked up from the server of the second location system. For example, the localization module 22 could perform a triangulation, trilateration, multilateration and/or fingerprinting type location estimation, but then output the result to a lower resolution than it was calculated, or adding a deliberate error. Alternatively the localization module 22 could perform the coarse location estimation based on an alternative type of localization technology or modality that, by its nature, is intrinsically coarser that that used by the first location system 4, 14, e.g. by simply detecting which of the nodes of the second location network 18 the mobile device 8 is closest to, and taking that node's location as the coarse estimate of the mobile device's location.

Note: in some embodiments, e.g. if the estimation is performed in a network-centric manner but "hamstrung" by a deliberate coarse quantization, the second server 20 could potentially know the mobile device's location more finely if its operator chose to do so. In such cases however, the technique may still be useful if the operator of the second server 20 is more trustworthy than the first server 14.

At step 130, the mobile device 8 submits, to the server 14 of the first location system, a request for the assistance data of a subset of the nodes 6 of the first location network 4, based on the coarse location estimate. This subset is identified as those reference nodes 6 of the first location system 4, 14 within a certain defined vicinity relative to the mobile device 8, whether within a predetermined vicinity or dynamically determined vicinity. Again this may be defined in any way based on the coarse location estimate for the mobile device 8, such as by being within a certain radius of the coarse location estimate, within a certain distance along a path relative to the coarse location estimate, or on the basis of being within a same building, room or zone as the mobile device 8. In embodiments, the controller 26 on the mobile device 8 performs this determination as to which nodes 6 of the first location network are in the desired subset, and submits a combined request identifying the subset to the location server 14 of the first location system. Alternatively, the mobile device 8 submits the coarse location estimate to the location server 14 of the first location system, and the server 14 determines the subset.

Either way, at step 132 the location server 14 of the first location system looks up the assistance data for the requested subset of nodes 6 in its database 24, and returns this data to the mobile device 8 where it is input to the localization module 22. The mobile device 8 can then use the received assistance data, along with the measurements that the mobile device 8 itself has taken from the reference nodes 6 of the first location network 4 (step 102), to compute its own location (again to a finer degree than the coarse estimate provided by the second location system 18, 20).

In another alternative implementation, the coarse location estimation could be performed based not on a separate, second location network 18 comprising a second set of distinct reference nodes; but rather based on one or more of the nodes 6 of the main (first) location network, but using a different type of localization technology or modality than used for the ultimate (finer) location estimation. For example, if each of the nodes 6 is a luminaire capable of emitting both RF and coded light, the fine location estimation could be based on the RF signals while the coarse estimation is performed based on coded light. Alternatively or additionally, the fine location estimation could be based on a technique such as triangulation, trilateration, multilateration and/or fingerprinting that requires signal measurements from a certain minimum plural number of nodes 6; while the coarse estimation could be based on only one node 6, or fewer than the minimum required for the first type of location estimation. E.g. the coarse location estimation could be performed by detecting which of the nodes 6 the mobile device 8 is closest to. As another example, a signal from one or more of the reference nodes 6 (e.g. coded light signal) may comprise an identifier of that identifies the respective node, part of which could be a "region code", allowing the retrieval of region location data from the second server 20. Or a coarse-gained location of the respective node 6 (such as what region it is located in) could even be encoded explicitly into the signal from one or more off the nodes 6 (being explicit in that it is interpretable by the mobile device 8 without the respective assistance data).

By whatever means the coarse location estimate is performed, the following now describes some optional additional features which may be used in conjunction with any of the above techniques.

In embodiments, the user 10 of the mobile device 8 can choose the coarseness of the alternative location system 18, 20 based on the level of privacy needed and storage available on the mobile device 8; and/or the user 10 of the mobile device 8 may choose the size of the vicinity of the coarse location for which assistance data is requested, based again on the level of privacy needed and storage available on the mobile 8. That is, the mobile device 8 can select how coarse its location should be calculated by the second server 20 (or by itself when done in a device-centric manner), and provide the location with the selected coarseness to the first location server. This decision may be based on the level of privacy the mobile user 10 needs and/or the available storage on the mobile to store larger amounts of assistance data. Further the mobile device 8 can select the size of the vicinity for which the assistance data should be provided to reduce the interaction with location servers.

Alternatively or additionally, in embodiments, the location server 14 of the first location system may implement one or more policies to set the maximum assistance data that will be provided per request (request 118 in the network centric approach for the second location system, or request 130 in the device centric approach), and enforce this policy even if a larger request is made by the mobile user. The location server 14 of the first system may also inform the mobile device 8 about this policy so that the mobile user 10 can decide whether to use the particular location server for localization 14, or to use an alternative if possible.

As mentioned above, one advantage that may be provided by embodiments disclosed herein (amongst others) is that the full database of assistance data (e.g. node locations), which is valuable, is not leaked to the public or competitors. However, note that even using the above techniques, there is a still a possibility that an unscrupulous party could recreate the database, or a significant part of it, by systematically collecting the data from a plurality of locations, or by colluding with multiple other users to combine the assistance data provided to the mobile devices of those users, or even by eavesdropping on the assistance data being received by multiple non-colluding users who are not themselves willing or knowing participants in the action. In embodiments, one or more further optional security features may be included in order to make collusion and/or eavesdropping more difficult.

In embodiments, the locations of the nodes (or other assistance data) may be encrypted at the location server 14 and sent to the mobile device 8 in encrypted form, requiring decryption by the mobile device 8. For example each mobile device 8 may be provided with a private/public key pair, the first server 14 arranged so that the locations (or other assistance data) of all the nodes 6 are "encrypted" using the public key of the key pair of the mobile device 8, so that other devices would not be able to access the data. E.g. the keys could be shared with the network centric devices using X.509 public key certificates. Or alternatively the assistance data could be encrypted using a private key of a private/public key pair of the first server 14, and the public key provided to only the desired, legitimate mobile devices 8 for decryption.

Encrypting data only solves an eavesdropper problem, not collusion unless the mobile device enforces policies not to share decrypted data, since a colluding party can share the decrypted data with other colluding parties making encryption ineffective. Such policies can be enforced by digital right management technologies on the mobile device 8 running a trusted platform. Further collusion can be suppressed by either (i) detecting possible fraudulent behaviour on the server side (e.g. by detecting systematic patterns of requests for assistance data) or (ii) making the distributed assistance data go "stale" so that collusion is of less value.

Option (ii) involves renewing some essential property of the assistance data at the first server 14 on a regular basis (e.g. periodically or with random timing), such as by changing the encryption, or changing the mapping of node IDs to nodes 6. Another possibility is to include a version number in the beacon signals so that if the version increases, mobile devices 8 are required to request new "coarse" and/or "fine" granularity data instead of using their locally cached data.

It will be appreciated that the above embodiments have been described only by way of example. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A controller for assisting in determining a location of a mobile device based on a first location estimation performed using a first location system, the first location system comprising a first network of wireless reference nodes, and the controller being configured to:
   obtain an initial estimate of the location of the mobile device based on a second location estimation coarser than the first location estimation, the second location estimation being based on a second location system comprising a second network of wireless reference nodes separate from the first network of wireless reference nodes;
   use the initial estimate to select a subset of the reference nodes of the first network, the subset being selected based on being within a defined vicinity of the location of the mobile device as determined from the initial estimate; and
   from amongst a database of respective assistance data for each of the reference nodes of the first network stored on a server of the first location system, selectively provide the respective assistance data for said subset of wireless reference nodes to a localization module on the mobile device, for the localization module of the mobile device to calculate a finer estimate of the location of the mobile device, the finer estimate being calculated to a finer degree than the initial estimate, by performing the first location estimation based on signals communicated between the mobile device and some or all of said subset of nodes, and on the respective assistance data for said some or all of the subset of reference nodes,
   wherein the second location estimation is performed by a server of the second location system, and the controller is configured to receive the initial estimate from the server of the second location system.

2. The controller of claim 1, wherein the controller is implemented in the server of the first location system, and wherein said selective provision comprises the controller being configured to selectively report the respective assistance data for each of said subset of wireless reference nodes from the server of the first location system to the mobile device.

3. The controller of claim 1, wherein the controller is implemented in the mobile device, and wherein said selective provision comprises the controller being configured to selectively request the respective assistance data for each of said subset of wireless reference nodes from the server of the first location system, based on said initial location estimate.

4. The controller of claim 1, wherein the respective assistance data for each of the reference nodes comprises a respective location of each of the reference nodes.

5. The controller of claim 1, wherein the first network is a dedicated location network.

6. The controller of claim 1, wherein the second location estimation is obtained based on a second location system comprising a second network of wireless reference nodes, the second network comprising a virtual second network consisting of all or a subset of the first network of wireless reference nodes.

7. The controller of claim 1, wherein the second location estimate is obtained based on one or more of the reference nodes of the first location network, but fewer of the nodes than a minimum required to perform the first location estimation.

8. The controller of claim 3, wherein said one or more nodes broadcast an indication of a region within which the one or more nodes are located, said indication being interpretable by the controller on the mobile device without any of the assistance data from the first server, and the second location estimation comprises a determination that the mobile device is located in said region based on the receipt by the mobile device of said indication.

9. The controller of claim 1, configured to allow the mobile device to choose the coarseness of the second location estimation and/or a size of said vicinity.

10. The controller of claim 1, wherein the server of first location system applies a policy to limit the number of the wireless reference nodes that assistance data can be obtained for per request to a maximum number.

11. A method of determining a location of a mobile device based on a first location estimation performed using a first location system, the first location system comprising a first network of wireless reference nodes, and the method comprising:
    obtaining an initial estimate of the location of the mobile device based on a second location estimation coarser than the first location estimation, the second location estimation being based on a second location system comprising a second network of wireless reference nodes separate from the first network of wireless reference nodes;
    using the initial estimate to select a subset of the reference nodes of the first network, the subset being selected based on being within a defined vicinity of the location of the mobile device as determined from the initial estimate; and
    from amongst a database of respective assistance data for each of the reference nodes of the first network stored on a server of the first location system, selectively providing the respective assistance data for each of said subset of wireless reference nodes to a localization module on the mobile device, for the mobile device to calculate a finer estimate of the location of the mobile device, the finer estimate being calculated to a finer degree than the initial estimate, by performing the first location estimation based on signals communicated between the mobile device and some or all of said subset of reference nodes, and on the respective assistance data for said some or all of the subset of reference nodes,
    wherein the second location estimation is performed by a server of the second location system, and the initial estimate is received from the server of the second location system.

12. A computer program product for assisting in determining a location of a mobile device based on a first location estimation performed using a first location system, the first location system comprising a first network of wireless reference nodes, and the computer program product comprising code embodied on a non-transitory computer readable medium and/or being downloadable therefrom, configured so as when executed to perform operations of:
    obtaining an initial estimate of the location of the mobile device based on a second location estimation coarser than the first location estimation, the second location estimation being based on a second location system comprising a second network of wireless reference nodes separate from the first network of wireless reference node;
    using the initial estimate to select a subset of the reference nodes of the first network, the subset being selected based on being within a defined vicinity of the location of the mobile device as determined from the initial estimate; and
    from amongst a database of respective assistance data for each of the wireless reference nodes of the first network stored on a server of the first location system, selectively providing the respective assistance data for each of said subset of wireless reference nodes to a localization module on the mobile device, for the mobile device to calculate a finer estimate of the location of the mobile device, the finer estimate being calculated to a finer degree than the initial estimate, by performing the first location estimation based on signals communicated between the mobile device and some or all of said subset of reference nodes, and on the respective assistance data for said some or all of the subset of reference nodes,
    wherein the second location estimation is performed by a server of the second location system, and the initial estimate is received from the server of the second location system.

* * * * *